United States Patent
Lee et al.

(10) Patent No.: US 10,858,003 B2
(45) Date of Patent: Dec. 8, 2020

(54) VEHICLE TRANSMISSION SYSTEM AND A METHOD THEREOF

(71) Applicants: Hyundai Motor Company, Seoul (KR); Kia Motors Corporation, Seoul (KR)

(72) Inventors: Sueng Ho Lee, Seoul (KR); Woochurl Son, Seongnam-si (KR); Dong Hee Han, Seoul (KR); Yong Woo Shin, Seoul (KR); Jin San Kim, Hwaseong-si (KR); Chong Tae Yang, Uiwang-si (KR); Choung Wan Son, Yongin-si (KR); Young Chan Gweon, Hwaseong-si (KR); Kijong Park, Hwaseong-si (KR); Young Chul Jeong, Seoul (KR); Dong Hyup Kang, Seoul (KR); Jihun Lee, Seoul (KR); Yeongseop Park, Seoul (KR); Cheol Ho Jang, Busan (KR); Jihwan Byun, Hwaseong-si (KR); Wootae Kim, Anyang-si (KR); Jung Woo Kim, Uiwang-si (KR); Han Ki Hong, Seongnam-si (KR); Ki Been Lim, Yongin-si (KR); Changgi Yeo, Suwon-si (KR); Hwangbok Lee, Seoul (KR); Hwan Hur, Seoul (KR); Woo Jin Chang, Suwon-si (KR); Nag Geun Song, Anyang-si (KR); Bo Hee Lee, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/592,481

(22) Filed: Oct. 3, 2019

(65) Prior Publication Data

US 2020/0353927 A1    Nov. 12, 2020

(30) Foreign Application Priority Data

May 7, 2019   (KR) .......................... 10-2019-0053195

(51) Int. Cl.
*B60W 30/18*   (2012.01)
*B60W 10/02*   (2006.01)
(Continued)

(52) U.S. Cl.
CPC ...... *B60W 30/18009* (2013.01); *B60W 10/02* (2013.01); *B60W 10/06* (2013.01);
(Continued)

(58) Field of Classification Search
CPC ......... B60W 30/18009; B60W 10/113; B60W 10/06; B60W 10/02; B60W 30/18027;
(Continued)

(56) References Cited

U.S. PATENT DOCUMENTS 9,194,312 B2 *   11/2015   Sugano ................. B60W 10/06
9,739,220 B2 *   8/2017   Matsubara ........... F02D 41/0007
(Continued)

*Primary Examiner* — Justin Holmes
(74) *Attorney, Agent, or Firm* — Morgan, Lewis & Bockius LLP

(57) ABSTRACT

A vehicle transmission system may include an engine outputting power from fuel combustion, a transmission coupled to the engine and including at least one clutch to control torque input from the engine, an supercharger compressing an intake air and supplying the compressed intake air to the engine, and a control unit, where, when a predetermined acceleration condition is satisfied, the control unit is configured to operate the supercharger and to control the transmission according to a transmission clutch stroke operation map corresponding to the operation of the electric supercharger, to vary an engagement speed of the clutch when the supercharger is operated.

20 Claims, 10 Drawing Sheets

(51) Int. Cl.
  *B60W 10/113* (2012.01)
  *B60W 10/06* (2006.01)
  *F02B 37/00* (2006.01)
  *F02B 29/04* (2006.01)

(52) U.S. Cl.
  CPC .... *B60W 10/113* (2013.01); *B60W 30/18027* (2013.01); *F02B 29/04* (2013.01); *F02B 37/00* (2013.01); *B60W 2510/0633* (2013.01); *B60W 2520/105* (2013.01); *B60W 2540/10* (2013.01); *B60W 2552/15* (2020.02); *B60W 2710/021* (2013.01); *B60W 2710/10* (2013.01)

(58) Field of Classification Search
  CPC ......... B60W 2552/15; B60W 2540/10; B60W 2510/0633; B60W 2710/10; B60W 2520/105; B60W 2710/021; F02B 29/04; F02B 37/00
  See application file for complete search history.

(56) References Cited

U.S. PATENT DOCUMENTS

2013/0311055 A1* 11/2013 Whitney ............... B60W 10/02
  701/54
2014/0330492 A1* 11/2014 Hasegawa ............. B60W 10/10
  701/54

* cited by examiner

VEHICLE TRANSMISSION SYSTEM AND A METHOD THEREOF

CROSS-REFERENCE TO RELATED APPLICATION

The present application claims priority to Korean Patent Application No. 10-2019-0053195 filed on May 7, 2019, the entire contents of which is incorporated herein for all purposes by this reference.

BACKGROUND OF THE INVENTION

Field of the Invention

The present invention relates to a vehicle transmission system and a method thereof.

Description of Related Art

An automatic transmission (AT) for a vehicle is typically provided with a torque converter, and such a torque converter is known to have a torque multiplication function, which may improve acceleration responsiveness and drivability during starting-up/reacceleration of a vehicle, however may deteriorate fuel efficiency.

To enhance fuel consumption characteristic of an automatic transmission, automotive manufactures are adopting automated transmissions that do not employ a torque converter and instead utilize a friction clutch during starting and reacceleration of a vehicle. A dual clutch transmission (DCT) or an automated manual transmission (AMT) may be an example of such an automated transmission utilizing a friction clutch for starting-up (which may also called as launch) of a vehicle.

In such an automated transmission, one or more friction clutches for starting upwards a vehicle are typically located between one or more input shaft and an output element of an engine. A double clutch transmission (DCT), alternately shifting between odd-numbered shifting stages and even-numbered shifting stages, may be a typical example of the automated transmission, and provides merits of power delivery efficiency and fuel consumption efficiency in comparison with an automatic transmission (AT).

Regarding starting-up/reacceleration characteristics, a conventional automatic transmission improves acceleration responsiveness in starting-up/reacceleration by torque multiplication of the torque converter, However, a typical DCT does not provide such a torque multiplication function, and thus, the gear ratio for the shift-stage to start up a vehicle is typically set high to improve acceleration responsiveness in starting-up/reacceleration. Thus, if a DCT may also provide sufficient responsiveness in starting-up/reacceleration without artificially altering the gear ratio, such may provide improvement of an overall functionality of a DCT.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle transmission system and a method thereof having advantages of enhancing drivability of a vehicle provided with a transmission employing a friction clutch instead of a torque converter to selectively receive an engine torque.

An exemplary vehicle transmission system may include an engine outputting power from fuel combustion, a transmission coupled to the engine and including at least one friction clutch to control torque input from the engine, an electric supercharger compressing an intake air and supplying the compressed intake air to the engine, and a control unit, where, when a predetermined acceleration condition is satisfied, the control unit is configured to operate the electric supercharger and to control the transmission according to a transmission clutch stroke operation map corresponding to the operation of the electric supercharger, to vary an engagement speed of the clutch when the electric supercharger is operated.

The transmission may be one of a dual clutch transmission (DCT) and an automated manual transmission (AMT) without employing a torque converter.

The vehicle transmission system may further include a turbocharger which is driven by an exhaust pressure of the engine to compress an air to a first boost pressure and to output the compressed intake air to a first intake line, and an intake flow control valve which is mounted at the first intake line and configured to guide the compressed intake air of the first boost pressure to the electric supercharger through a second intake line branched from the first intake line.

The electric supercharger may compress the air of the first boost pressure to a second boost pressure, and supplies the second boost pressure to the engine.

The vehicle transmission system may further include an intercooler mounted on the first and second intake lines and configured to cool the intake air compressed by the turbocharger and the electric supercharger.

The control unit may include an engine controller configured to control an engine torque of the engine based on an APS operation signal, an electric supercharger controller configured of operating the electric supercharger upon determining that the predetermined acceleration condition is satisfied, a valve controller configured of closing the intake flow control valve upon an operation of the electric supercharger such that an air may be guided to the electric supercharger, a transmission controller configured of applying a plurality of transmission clutch stroke operation maps based on whether the electric supercharger is operated, and an integrated controller. The integrated controller controls the engine controller, the electric supercharger controller, the valve controller, and the transmission controller, based on driving information related to the vehicle.

The transmission controller may be configured to determine that a hard acceleration starting-up condition is satisfied as the predetermined acceleration condition, when an increase rate of the APS operation signal exceeds a predetermined first threshold value while the vehicle is stationary, or when a difference of an actual engine torque from a requested torque by the APS operation signal exceeds a predetermined second threshold value while the vehicle is stationary.

The transmission controller may be configured to determine that the predetermined acceleration condition is satisfied, when an increase rate of the APS operation signal exceeds a predetermined third threshold value while the vehicle is running, or when a difference of an actual engine torque from a requested torque by the APS operation signal exceeds a predetermined fourth threshold value while the vehicle is The transmission controller may be configured to determine that a kick-down acceleration condition is satisfied as the predetermined acceleration condition when a road slope detected as the driving information indicates a horizontal road or an uphill road, and that an un-shifted reacceleration condition is satisfied as the predetermined acceleration condition when a road slope detected as the driving information indicates a downhill road.

The transmission controller may be configured to control the clutch engagement speed of the transmission according to a first stroke operation map for a normal mode. The transmission controller may be configured to control the clutch engagement speed of the transmission according to a second stroke operation map upon determining that the predetermined acceleration condition is satisfied, the second stroke operation map facilitating faster clutch engagement speed than the first stroke operation map.

The electric supercharger controller may stop the operation of the electric supercharger when at least one of deceleration of the vehicle, coincidence of a requested torque and an actual engine torque, and starting of shifting to a current shift-stage to another shift-stage is identified.

The control unit may operate the electric supercharger and may control the transmission with the transmission clutch stroke operation map corresponding to the operation of the electric supercharger, upon determining that the predetermined acceleration condition is satisfied based on an increase rate of a requested torque during an autonomous driving of the vehicle.

An exemplary method is configured for controlling a transmission of a vehicle, where the transmission includes at least one friction clutch to selectively receive a torque of an engine, and the vehicle is provided with a supercharger for boosting an intake air pressure. The method may include a) collecting driving information of the vehicle after the engine is started, b) determining whether a predetermined acceleration condition is satisfied based on an increase rate of a requested torque of the engine, c) operating the electric supercharger upon determining that the predetermined acceleration condition is satisfied, and d) controlling the transmission according to a transmission clutch stroke operation map corresponding to an operation of the electric supercharger, to increase an engagement speed of the clutch when the electric supercharger is operated.

The step b) may include determining that a hard acceleration starting-up condition is satisfied as the predetermined acceleration condition, when the increase rate of the APS operation signal exceeds a predetermined first threshold value while the vehicle is stationary. The step b) may include determining that the hard acceleration starting-up condition is satisfied as the predetermined acceleration condition, when a difference of an actual engine torque from a requested torque by the APS operation signal exceeds a predetermined second threshold value while the vehicle is stationary.

The step b) may include determining that a kick-down acceleration condition is satisfied as the predetermined acceleration condition, when the increase rate of the APS operation signal exceeds a predetermined third threshold value while the vehicle is running. The step b) may include determining that a kick-down acceleration condition is satisfied as the predetermined acceleration condition, when a difference of an actual engine torque from a requested torque by the APS operation signal exceeds a predetermined fourth threshold value while the vehicle is running.

In the step b), it may be determined that an un-shifted reacceleration condition is satisfied as the predetermined acceleration condition when the hard acceleration starting-up condition is satisfied while the vehicle is decelerating due to a brake operation or coasting.

In the step b), it may be determined that an un-shifted reacceleration condition is satisfied as the predetermined acceleration condition, when the kick-down acceleration condition is satisfied while a road slope detected as the driving information indicates a downhill road.

The step c) may include closing an intake flow control valve mounted on a first intake line bypassing the electric supercharger to force an intake air to pass the electric supercharger.

The step d) may include releasing a first stroke operation map for controlling an engagement speed of the clutch at a normal clutch engagement speed, and applying a second stroke operation map for controlling the clutch engagement speed of the transmission at a clutch engagement speed faster than the normal clutch engagement speed.

The method may further include, after the step d), determining whether a boost stoppage condition is satisfied, stopping the operation of the electric supercharger when the boost stoppage condition is satisfied, and changing the transmission clutch stroke operation map from the second stroke operation map to the first stroke operation map when the boost stoppage condition is satisfied, wherein the boost stoppage condition is determined to be satisfied when the increase rate of the APS operation signal is decreased below the predetermined first threshold value, or when the vehicle speed decreases by the operation of a brake of the vehicle.

According to an exemplary embodiment of the present invention, an electric supercharger is cooperative controlled for controlling an automated transmission having a friction clutch instead of a torque convertor for communicating torque with an engine, achieving a torque multiplication effect and improving the vehicle acceleration.

Furthermore, by controlling the clutch engagement faster when the electric supercharger is operated, the amount and duration of a slip of the clutch may be decreased, improving acceleration responsiveness and drivability of the vehicle.

Consequently, gear ratios of the automated transmission may be lowered while achieving sufficient launch/acceleration torque, which may result in enhancement of fuel consumption of a vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
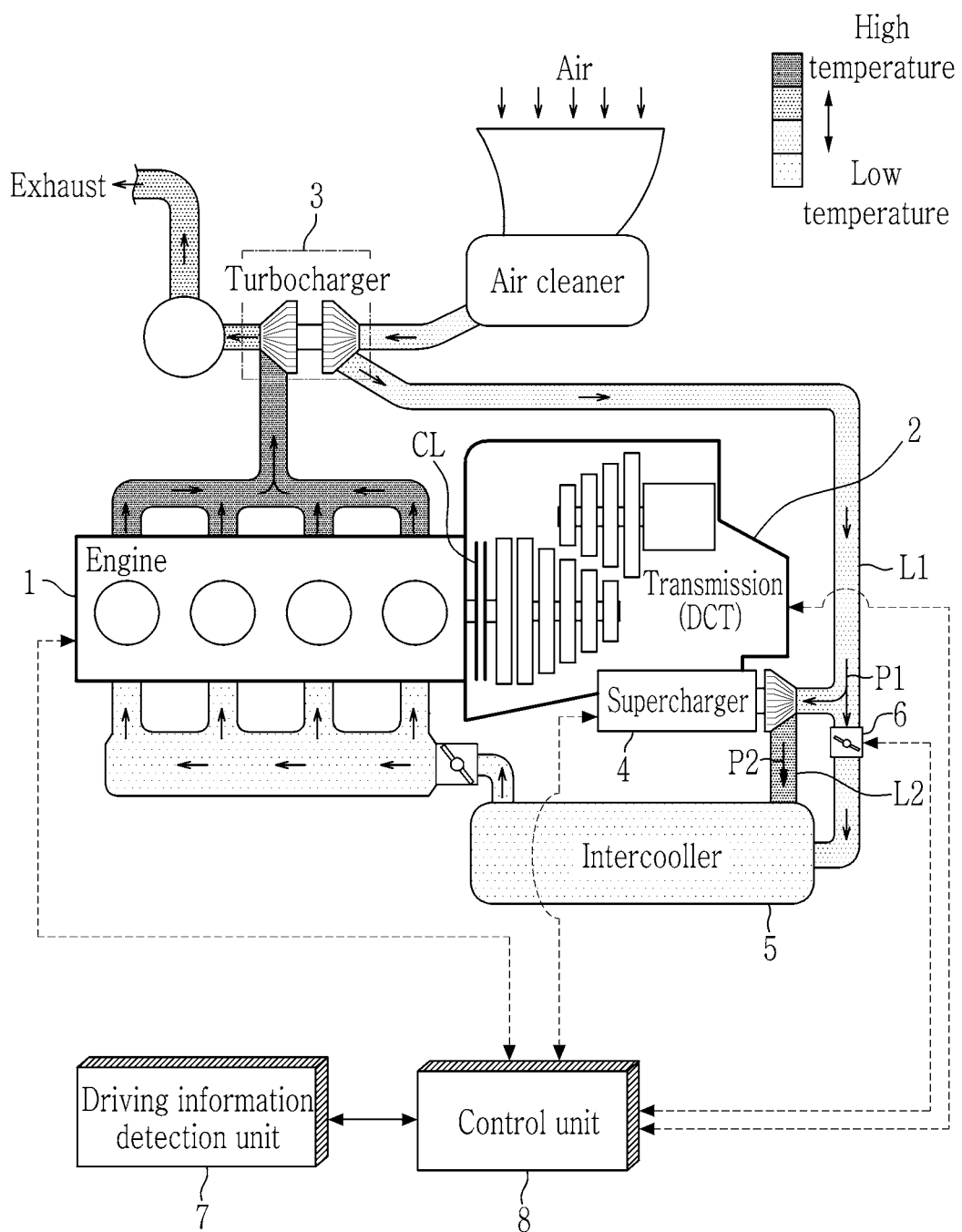
FIG. 1 shows a schematic view of a vehicle transmission system according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Furthermore, unless explicitly described to the contrary, the word "comprise" and variations such as "comprises" or "comprising", will be understood to imply the inclusion of stated elements but not the exclusion of any other elements. Furthermore, the terms "-er", "-or" and "module" described in the specification mean units for processing at least one function and operation and may be implemented by hardware components or software components and combinations thereof.

In the specification, various values such as exemplified numeral values, reference values, and threshold values, may be provided for mere examples, and an exemplary embodiment of the present invention is not limited to such values.

A vehicle may include, as well as a typical internal combustion engine vehicle, other types of vehicles such as a hybrid vehicle.

A vehicle transmission system and method according to an exemplary embodiment of the present invention is hereinafter described in detail with reference to the drawings.

FIG. 1 shows a schematic view of a vehicle transmission system according to an exemplary embodiment of the present invention.

Referring to FIG. 1, a vehicle transmission system according to an exemplary embodiment of the present invention includes an engine 1, a transmission 2, a turbocharger 3, an electric supercharger 4, an intercooler 5, an intake flow control valve 6, a driving information detection unit 7, and a control unit 8.

The engine 1 is a power source to convert a thermal energy of fuel combustion to a mechanical energy.

For example, the engine 1 may be a gasoline engine or a diesel engine, and may be appropriately controlled depending on an operation of a driver.

The transmission 2 may be an automated transmission utilizing at least one friction clutch CL instead of a torque converter in a typical automatic transmission. For example, the transmission 2 may be a dual clutch transmission (DCT).

For convenience and better understanding of the description, an exemplary embodiment of the present invention is hereinafter described referring to the transmission 2 as a DCT. However, it will be understood that the exemplary embodiment of the present invention is not limited thereto. It may be understood that the transmission 2 may be various types of transmissions, e.g., a DCT and an automated manual transmission (AMT).

In an exemplary embodiment of the present invention, engagement and/or disengagement of the clutch CL of the DCT 2 is controlled by a transmission clutch stroke operation map, depending on a driving mode of a vehicle. The driving mode may include a normal mode and a sports mode. The normal mode may indicate a mode where an APS operation signal according to a driver's accelerator pedal operation shows a moderate increase rate. The sports mode may indicate a mode where the APS operation signal according to a driver's accelerator pedal operation shows a high increase rate. A criterion whether the APS signal shows a moderate or high increase rate may be set by a person skilled in the art to an appropriate value based on design factors of a vehicle or a transmission. The normal and sports modes are examples of the driving mode, and the driving mode may further include another mode, such as an efficiency mode.

The DCT 2 controls actuator(s) for piston stroke operation of the double clutch, by which an output torque may be delivered to drive-wheels. The actuator(s) for applying piston stroke pressure for engagement of clutches may be operated electrically or hydraulically. Engagement of a clutch, e.g., a multi-plate clutch, by a piston stroke is well known to a person skilled in the art, and will be omitted in further detail.

The turbocharger 3 is a type of supercharger which is operated by an exhaust pressure to compress an air and to supply the compressed air to the engine 1. The turbocharger 3 may be formed as a typical turbocharger known in the art.

A turbine of the turbocharger 3 is rotated by the exhaust pressure of an exhaust gas of the engine 1, and thereby a compressor of the turbocharger 3 compresses the air supplied form an air cleaner, supplying the compressed air to the engine 1. Hereinafter, a pressure of the air primarily compressed by the turbocharger 3 is referred to as a first boost pressure P1.

That is, the turbocharger 3 supplies the first boost pressure P1 to the engine 1 through a first intake line L1, to enhance an output performance of the engine 1. Such a turbocharger 3 shows good performance in relatively high rotation speed of the engine since the exhaust pressure of the engine 1 is utilized.

In a low rotation speed of the engine 1, the engine 1 outputs relatively low exhaust pressure, and thus, the turbocharger 3 becomes less effective. Therefore, a so-called turbo lag typically occurs for an initial stage of acceleration of the engine 1 or in a low speed range of the engine 1, where a torque increase of the engine 1 takes a litter time after a driver's input of pressing the acceleration pedal.

For example, when starting a vehicle after stoppage, the first boost pressure P1 is not immediately formed after the driver's input of pressing an accelerator pedal, and thus an acceleration responsiveness of a vehicle may deteriorate. Thus, the turbocharger 3 may not be a sufficient tool to enhance drivability of the DCT 2 to compete with the torque multiplication effect of a conventional torque converter.

In an exemplary embodiment of the present invention, an electric supercharger 4 is included to enhance drivability of the DCT 2 in starting-up/reacceleration. An electric supercharger is typically driven by a motor and is known in the art, and details of the electric supercharger are not described in further detail.

The electric supercharger 4 compresses an input air and outputs the compressed air. In the present example, the electric supercharger 4 compresses the air supplied form the turbocharger 3, and then supplies the compressed air to the engine 1.

The electric supercharger 4 is employed to achieve a similar effect of torque multiplication of a torque converter of a conventional automatic transmission and to improve responsiveness of the DCT 2, in cooperation with fiction clutch control of the DCT 2, which will be described in detail below. Furthermore, it will be understood that, with the torque multiplication effect of the electric supercharger 4, gear ratios of the DCT 2 may be lowered while achieving sufficient launch torque, which may result in enhancement of fuel consumption of a vehicle provided with the DCT 2.

The electric supercharger 4 receives the first boost pressure from a second intake line L2 branched from the first intake line L1 connected to the turbocharger 3, and forms a second boost pressure P2, supplying the second boost pressure to the engine 1. The second boost pressure P2 obtained by secondarily compressing the first boost pressure P1 is higher than the first boost pressure P1, and therefore, the output torque of the engine 1 is further increased.

The electric supercharger 4, being electrically driven, may immediately form and supply the second boost pressure P2 to the engine 1, and therefore the output torque of the engine 1 is immediately increased regardless of low or high speed of the engine 1, improving responsiveness of a vehicle.

In an exemplary embodiment of the present invention, the electric supercharger 4 is located at an exterior of the transmission 2, and electrically connected to the control unit 8, e.g., through a CAN communication line (illustrated as a dotted arrow in FIG. 1).

The intercooler 5 cools the air heated by being compressed by the turbocharger 3 or the electric supercharger 4 and supplies the cooled air to the engine 1.

In further detail, the intercooler 5 may cool a primarily compressed air supplied from the turbocharger 3 at the first boost pressure, or may cool a secondarily compressed air of the second boost pressure P2 which is further compressed from the first boost pressure P1 by the electric supercharger 4.

For the present alternative operation, the intercooler 5 is connected to the first intake line L1 and the second intake line L2 to receive air therefrom.

It may be understood that the intercooler 5 is separate from a so-called radiator to cool the engine 1. That is, the intercooler 5 is to cool the air drawn into cylinders of the engine 1, and not to cool coolant circulating the engine 1. Such an intercooler 5 may be an air-cooled type or a water-cooled type.

The intake flow control valve 6 is mounted in the first intake line L1, and is controlled to open or closed by a control signal.

When the electric supercharger 4 is not operated, the intake flow control valve 6 is open such that the first boost pressure P1 formed by the turbocharger 3 is supplied to the intercooler 5 through the first intake line L1.

When the electric supercharger 4 is operated, the intake flow control valve 6 is closed. Therefore, the first boost pressure P1 is supplied to the electric supercharger 4 to be further compressed to the second boost pressure P2, and the second boost pressure P2 supplied to the intercooler 5 is not fed back to the first intake line L1. The second boost pressure P2 formed by the electric supercharger 4 is cooled at the intercooler 5 and is supplied to the engine 1.

The driving information detection unit 7 detects various driving information used for the transmission control, and sends the driving information to the control unit 8.

For example, the driving information detected by the driving information detection unit 7 may include an accelerator pedal sensor (APS) operation signal depending on an accelerator pedal stroke, a brake pedal sensor (BPS) operation signal depending on a brake pedal stroke, a vehicle speed, an engine torque (e.g., Nm), a road slope, a transmission status information, a turbocharger operations state (ON or OFF), an electric supercharger operations state (ON or OFF), and an intake flow control valve state (ON or OFF).

Furthermore, when the vehicle is provided with a so-called advanced driver assistance system, the driving information obtained by the driving information detection unit 7 may also include information for autonomous driving by a camera sensor, a Light Detection and Ranging (LiDAR) sensor, and a laser sensor.

The control unit 8 supervises an overall operation of a vehicle transmission system according to an exemplary embodiment of the present invention, and may include a program, data, and controllers.

The control unit 8 analyses the driving information received from the driving information detection unit 7, and operates the electric supercharger 4 when a predetermined operation condition such as starting-up, hard acceleration, or reacceleration conditions, depending on driving information related to the vehicle such as a driver's accelerator pedal operation. Furthermore, simultaneously with operating the electric supercharger, the control unit 8 alters a transmission clutch stroke operation map to increase an engagement speed of the clutch 2.

In the case of slow acceleration or reacceleration of the vehicle, the control unit 8 may apply a normal transmission clutch stroke operation map to control the DCT at a normal clutch engagement speed.

Hereinafter, the control unit 8 of an exemplary embodiment of the present invention is described in detail with reference to FIG. 2.

Figure 2:
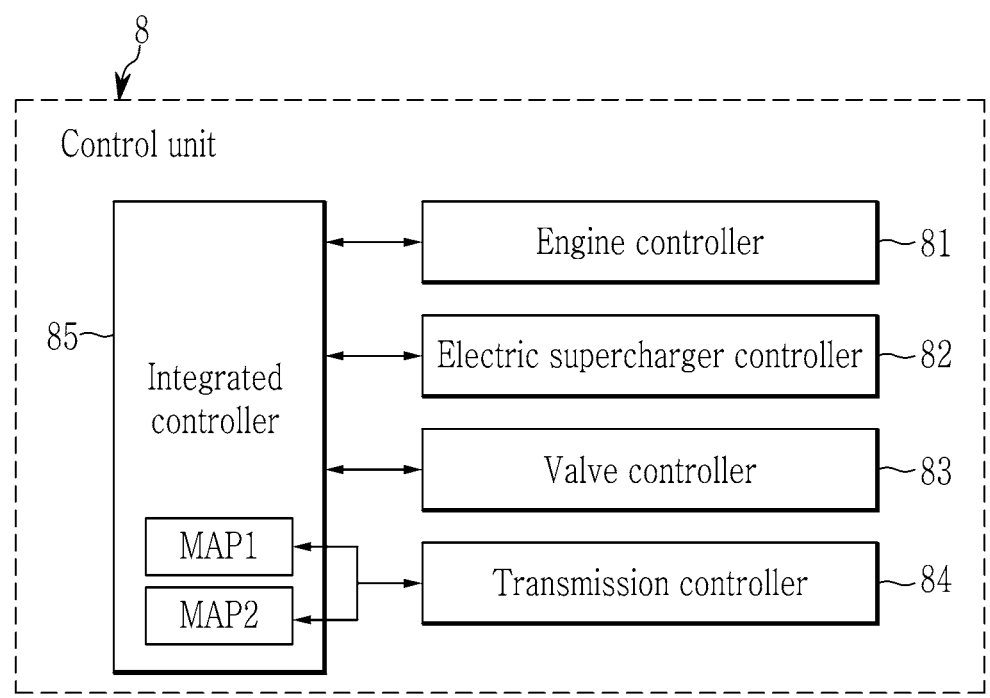
FIG. 2 is a block diagram of a control unit according to an exemplary embodiment of the present invention.

FIG. 2 is a block diagram of a control unit according to an exemplary embodiment of the present invention.

Referring to FIG. 2, the control unit 8 includes an engine control unit 81, an electric supercharger control unit 82, a valve control unit 83, a transmission control unit 84, and an integrated controller 85.

In an exemplary embodiment of the present invention, the control unit 8 can perform the functions of the engine control unit 81, the electric supercharger control unit 82, the valve control unit 83, the transmission control unit 84, and the integrated controller 85 in a single processor configured to execute one or more steps interpreted as an algorithm structure. The memory stores algorithm steps, and the processor executes the algorithm steps to perform one or more processes of a method in accordance with various exemplary embodiments of the present invention.

The engine control unit 81 controls the engine torque (e.g., Nm) based on the driving information detected by the driving information detection unit 7, such as the APS operation signal due to driver's accelerator pedal operation.

The electric supercharger control unit 82 controls the operation of the electric supercharger 4, based on the driving information detected by the driving information detection unit 7, such as the APS operation signal due to driver's accelerator pedal operation.

The electric supercharger control unit 82 may deactivate the operation of the electric supercharger 4, for example, when the vehicle is decelerated, when the engine torque equals a driver's requested torque (target torque), or when the transmission 2 is under a shifting operation.

The valve control unit 83 controls to open or closed state of the intake flow control valve 6 to open or close the first intake line L1. For example, the valve control unit 83 closes the intake flow control valve 6 simultaneously when the electric supercharger 4 is operated, to inflow the first boost pressure P1 to the electric supercharger 4.

Furthermore, the valve control unit 83 opens the intake flow control valve 6 simultaneously when the electric supercharger 4 is stopped, to inflow the first boost pressure P1 to the intercooler 5.

The transmission control unit 84 controls upshift and downshift of the transmission 2 based on the driving information detected by the driving information detection unit 7, by use of predetermined transmission clutch stroke operation maps.

That is, the transmission control unit 84 variably utilizes the transmission clutch stroke operation maps depending on the operation of the electric supercharger 4.

The variable application of the transmission clutch stroke operation maps is to further enhance responsiveness of the vehicle according to a driver's input (e.g., accelerator pedal operation), in cooperation with the operation of the electric supercharger 4. For example, even if the engine torque is increased by the operation of the electric supercharger 4, acceleration responsiveness may not be enhanced when the clutch engagement speed is low since the power delivery from the engine to the transmission 2 is delayed. Furthermore, when the clutch engagement speed is controlled excessively high at an insufficient engine torque without operating the electric supercharger 4, the operation of the engine 1 may not be stable and may be stalled.

Therefore, when the electric supercharger 4 is not operated, the transmission control unit 84 applies a first stroke operation map MAP1 to control the DCT 2 at a normal clutch engagement speed that corresponds to a normal mode of the vehicle.

When the electric supercharger 4 is operated, the transmission control unit 84 applies a second stroke operation map MAP2 to control the DCT 2 at a higher clutch engagement speed that corresponds to a sports mode (or a hard acceleration mode) of the vehicle. By such a configuration, at an early stage of staring-up of the vehicle, the engine torque is increased by the boost pressure of the electric supercharger 4, and the clutch engagement is controlled rapid by use of the second stroke operation map MAP2. Therefore, the transmission 2 may receive more torque from the engine 1 immediately on the driver's input (e.g., an accelerator pedal operation), which effectively achieve a torque multiplication effect of a torque converter in a conventional automatic transmission.

Thus, by employing the electric supercharger 4 and controlling the clutch stroke speed, the torque multiplication effect may be realized at the transmission 2 without a torque converter.

The integrated controller 85 is a supervisor controller that is configured to control an overall operation of a vehicle transmission system according to an exemplary embodiment of the present invention.

The integrated controller 85 forms control signals based on the driving information collected at the driving information detection unit 7. The integrated controller 85 sends the control signals to the subordinate controllers 81, 82, 83, and 84 to control the operation of the controllers 81, 82, 83, and 84.

A method of controlling a vehicle transmission according to an exemplary embodiment of the present invention will be hereinafter described in detail with reference to the drawings.

It may be understood that, although various controllers have been described with reference to FIG. 2, such controllers may be integrated into a single controller or a control unit, or functions of the controllers may be dividedly implemented by more number of controllers. In the present background, merely the control unit 8 is referred to as an element to function as a controller in hereinafter describing a method of controlling a vehicle transmission according to various exemplary embodiments.

First Exemplary Embodiments

Figure 3:
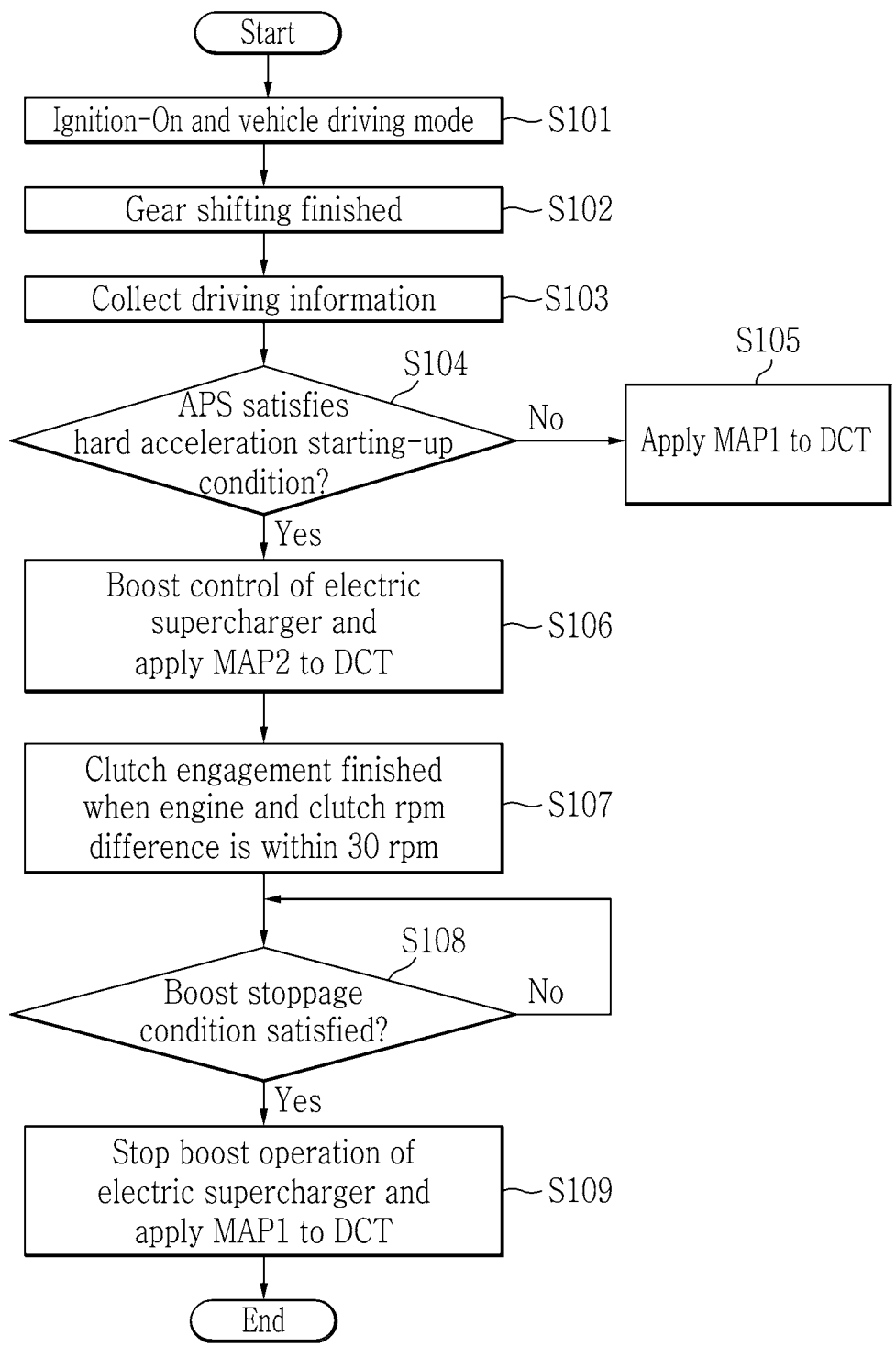
FIG. 3 is a flowchart showing a method of controlling a vehicle transmission in a starting-up condition according to various exemplary embodiments of the present invention.

FIG. 3 is a flowchart showing a method of controlling a vehicle transmission in a starting-up condition according to various exemplary embodiments of the present invention.

Figure 4:
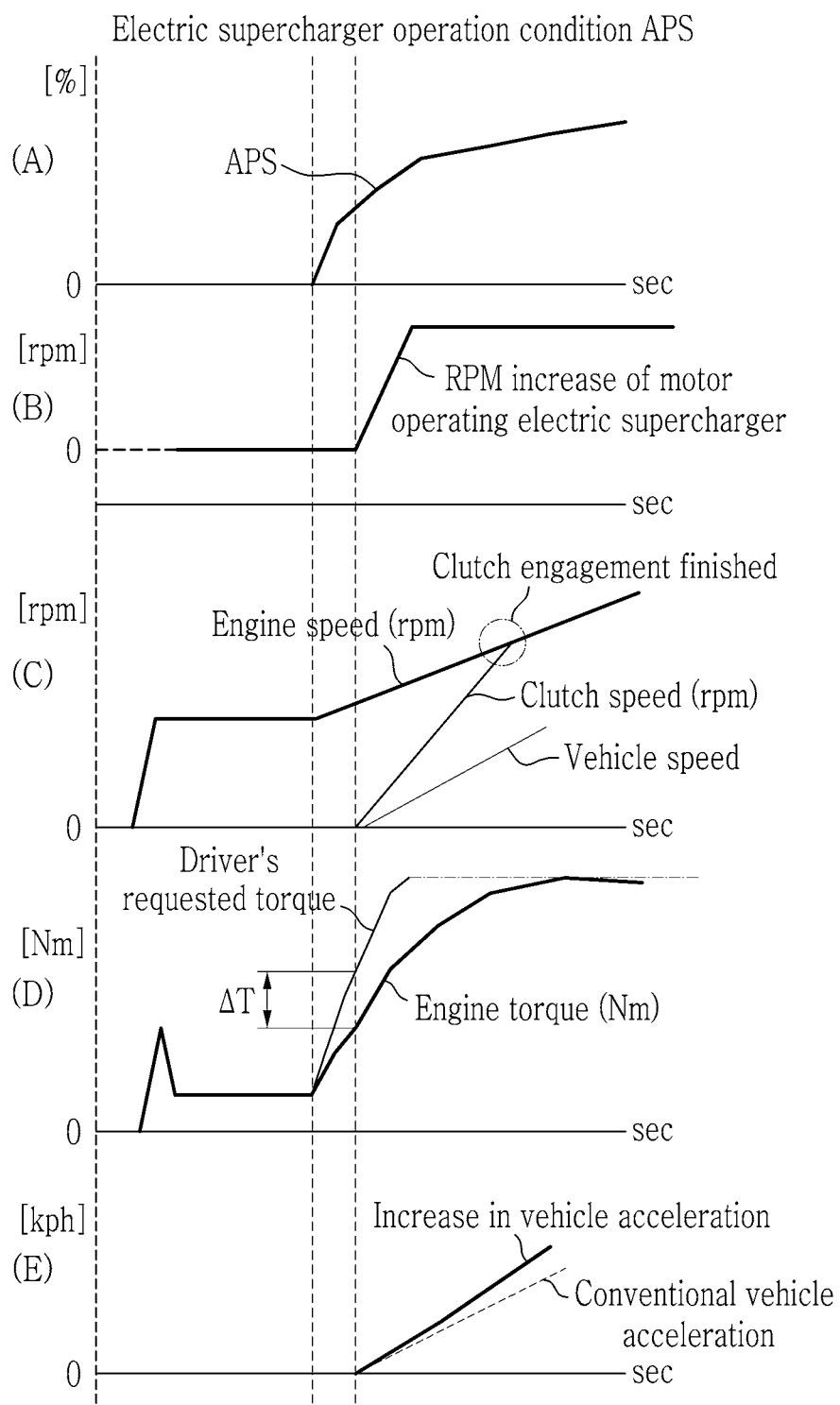
FIG. 4 is a graph showing vehicle transmission control status in the starting-up condition of FIG. 3 according to various exemplary embodiments of the present invention.

FIG. 4 is a graph showing vehicle transmission control status in the starting-up condition of FIG. 3 according to various exemplary embodiments of the present invention.

Referring to FIG. 3 and FIG. 4, according to various exemplary embodiments of the present invention, an ignition key is turned on (IG-ON) and the engine 1 is started by the control unit 8 at step S101. Then at step S102, the transmission 2 finishes shifting to a certain shift-stage. For example, the control unit 8 may control the transmission (i.e., DCT) 2 to engage the first gear.

It should be understood that, although the first gear is engaged in the DCT 2, the clutch employed in the DCT 2 to control transmission of the engine torque into the DCT 2 may be still open. The clutch in the DCT 2 will be controlled according to an exemplary embodiment that will be described below.

As such, at step S103, the control unit 8 collects the driving information from the driving information detection unit 7, and analyzes the driving information to start the DCT clutch engagement control based on a hard acceleration starting-up condition. The driving information may include at least one of the APS operation signal, the BPS operation signal, the vehicle speed, the engine torque (e.g., Nm), the road slope, the transmission status information, the turbocharger operations state (ON or OFF), the electric supercharger operations state (ON or OFF), and the intake flow control valve state (ON or OFF).

At step S104, the control unit 8 determines whether the hard acceleration starting-up condition of the vehicle is satisfied. The hard acceleration starting-up condition may be determined, for example, by comparing an increase rate (e.g., APS %/sec) of the APS operation signal with an engine torque map (E-MAP). As well known in the art, the engine torque map (E-MAP) is a lookup table storing requested engine torques dependent on, e.g., a driver's accelerator pedal operation, i.e., the APS operation signal.

For example, at the step S104, the control unit 8 may determine the hard acceleration starting-up condition is satisfied when, from a vehicle state where the vehicle speed equals 0 km/h and the BPS operation signal is ON, the BPS operation signal is turned OFF and the increase rate (e.g., APS %/sec) of the APS operation signal exceed a predetermined first threshold value (e.g., 20%) stored in the engine torque map (E-MAP).

Alternatively, the control unit 8 may determine the hard acceleration starting-up condition based on a difference between a driver's requested torque and an actual torque of the engine 1. It may be understood that, under an abrupt hard acceleration, i.e., under a driver's abrupt and rapid accelerator pedal operation, the actual torque of the engine 1 may not immediately follow the requested torque. In the instant case, operating the supercharger 4 to build more torque of the engine 1 may be helpful for the engine 1 to closely follow the driver's requested torque. Thus, the control unit 8 may determine that the hard acceleration starting-up condition is satisfied when a difference (illustrated as ΔT in FIG. 4D) between the driver's requested torque and the actual torque of the engine 1 is greater than a second threshold value.

In the case that the hard acceleration starting-up condition is not satisfied (S104—NO), the control unit 8 applies, at step S105, the first stroke operation map MAP1 to control the DCT 2 at a normal clutch engagement speed, where the electric supercharger 4 is not operated. That is, when the vehicle is not under a hard starting-up acceleration, the control unit 8 controls the electric supercharger 4 not to operate and controls the DCT 2 at a normal mode.

Referring to FIG. 4, at time t0, the driver's abrupt and hard operation of the accelerator pedal is started as illustrated in FIG. 4A. As such, the torque of the engine 1 starts to actually increase. However, the actual torque of the engine 1 may not immediately grow to the driver's requested torque.

At time t1, the control unit 8 determines that the hard acceleration starting-up condition is satisfied (step S104—Yes), either based on the increase rate of the APS operation signal or based on the difference between the requested torque and the actual torque.

Thus, at time t1, by the hard acceleration starting-up condition being satisfied, the control unit 8 starts, at step S106, to operate the electric supercharger 4 to supply the second boost pressure P2 to the engine 1. At the step S106, the control unit 8 closes the intake flow control valve 6 mounted in the first intake line L1. Therefore, the air of the first boost pressure P1 is supplied to the electric supercharger 4, and the second boost pressure P2 of the electric supercharger 4 is supplied to the engine 1.

At the step S106, the control unit 8 increases the rotation speed of the electric supercharger 4, and operates the DCT 2 to engage the clutch according to the second stroke operation map MAP2 for an increased clutch engagement speed.

Under the control of the control unit 8, the rotation speed of the electric supercharger 4 is increased as shown in FIG. 4B, and accordingly, the boost pressure of the air supplied to the engine 1 is also increased, which results in an increase of output torque of the engine 1. Since the clutch engagement of the DCT 2 is simultaneously started based on the second stroke operation map MAP2, the clutch engagement of the DCT 2 is accelerated while the engine 1 is outputting more torque due to the operation of the electric supercharger 4. Therefore, more torque of the engine 1 is supplied into the DCT 2 more rapidly, by which a torque multiplication effect may be effectively achieved.

That is, under a hard acceleration starting-up situation, the engine torque is supplemented by operating the electric supercharger 4 and simultaneously the clutch engagement of the DCT 2 is accelerated by applying the second stroke operation map MAP2. Therefore, the actual torque of the engine 1 may follow the requested torque more closely than a conventional scheme, and the vehicle acceleration characteristic under a hard acceleration may be enhanced as shown in FIG. 4D and FIG. 4E.

At step S107, the control unit 8 determines that the clutch engagement of the DCT 2 is finished when the engine speed and the clutch rotation speed becomes within 30 rpm difference.

As such, at step S108, the control unit 8 determines whether a boost stoppage condition of the electric supercharger 4 is satisfied, based on the driving information related to the vehicle.

For example, the control unit 8 may determine that the boost stoppage condition is satisfied when the actual engine torque becomes the same as the driver's requested torque.

Furthermore, the control unit 8 may determine that the boost stoppage condition is satisfied when the increase rate of the APS operation signal is decreased below the predetermined first threshold value of the engine torque map (E-MAP), or when the vehicle speed decreases by the operation of a brake of the vehicle.

Furthermore, the control unit 8 may determine that the boost stoppage condition is satisfied when the transmission status information indicates a shifting from a current shift-stage to another shift-stage is detected.

When the boost stoppage condition is satisfied (S108—Yes), the control unit 8 stops the operation of the electric supercharger 4, and finishes the hard acceleration starting-up control at step S109. At the step S109, the control unit 8 controls the intake flow control valve 6 open, and alters second stroke operation map MAP2 to the normal first stroke operation map MAP1 for clutch engagement/disengagement control of the DCT 2 in subsequent shifting.

Second Exemplary Embodiments

Figure 5:
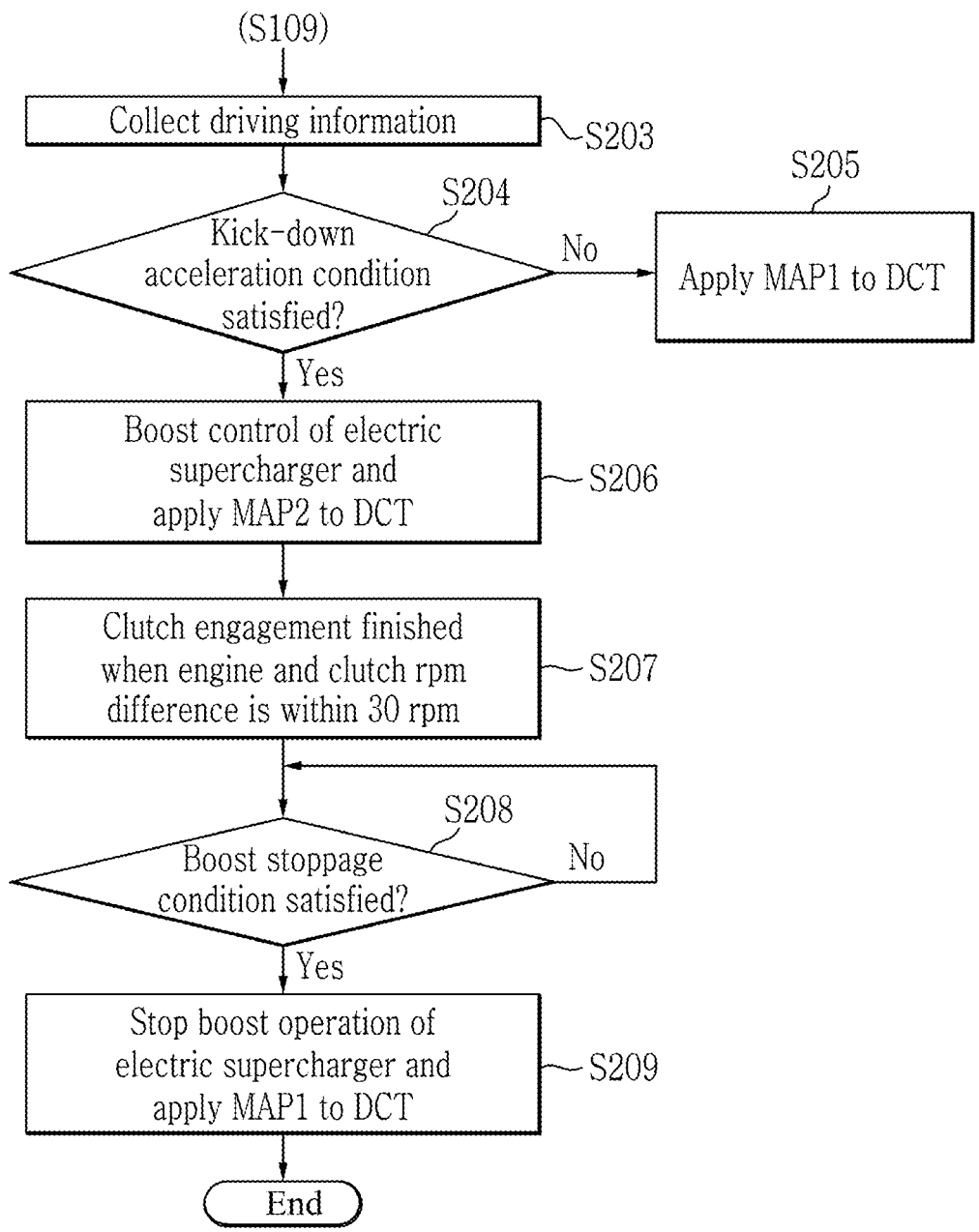
FIG. 5 is a flowchart showing a method of controlling a vehicle transmission in a kick-down acceleration condition according to various exemplary embodiments of the present invention.

FIG. 5 is a flowchart showing a method of controlling a vehicle transmission in a kick-down acceleration condition according to various exemplary embodiments of the present invention.

Figure 6:
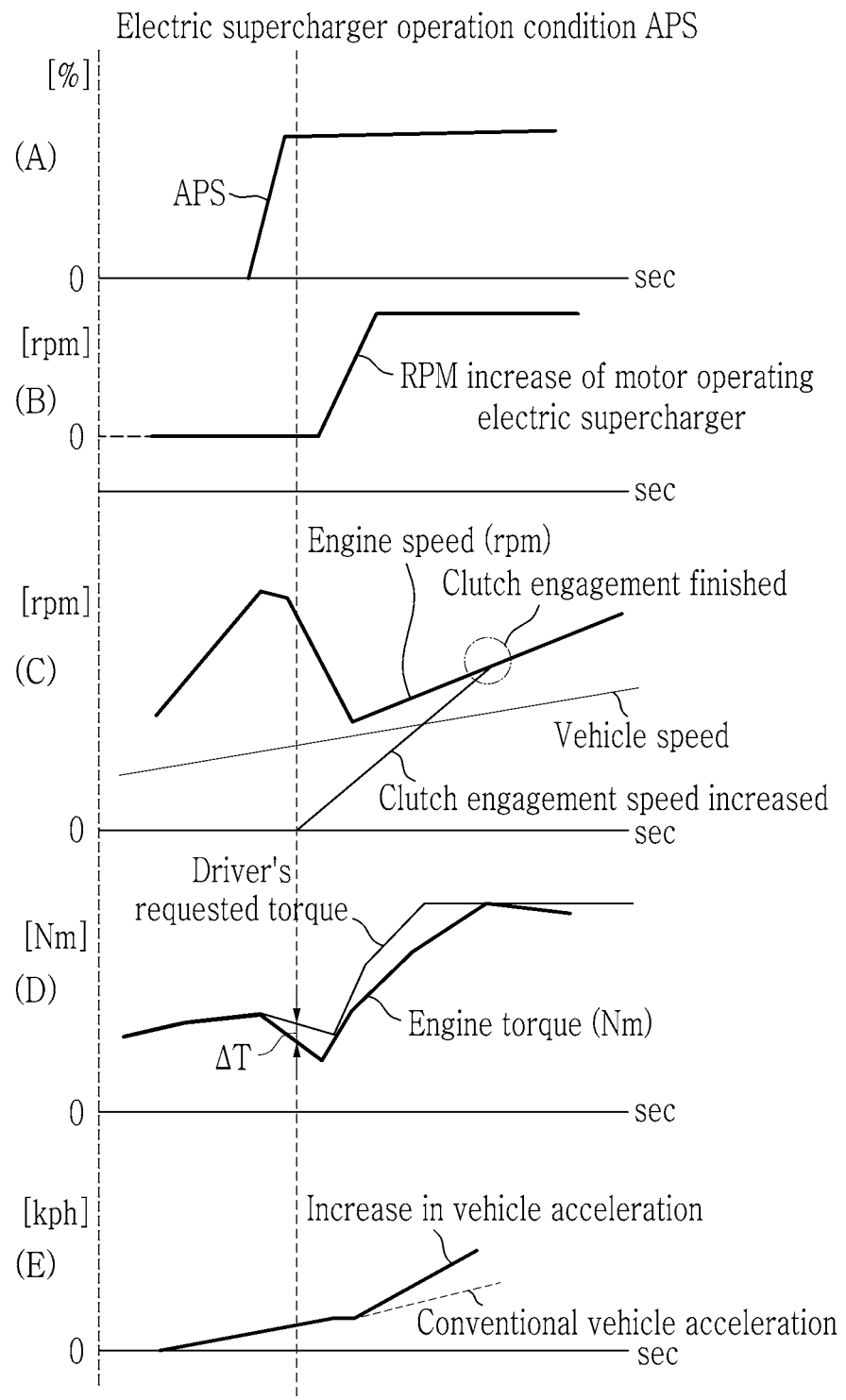
FIG. 6 is a graph showing vehicle transmission control status in the kick-down acceleration condition of FIG. 5 according to various exemplary embodiments of the present invention.

FIG. 6 is a graph showing vehicle transmission control status in the kick-down acceleration condition of FIG. 5 according to various exemplary embodiments of the present invention.

Referring to FIG. 5 and FIG. 6, a method of controlling a vehicle transmission under a kick-down acceleration condition according to various exemplary embodiments of the present invention is described with reference to the case of driving after the vehicle starting-up control shown in FIG. 3.

At step S203, the control unit 8 analyzes driving information collected from the driving information detection unit 7, and controls the DCT clutch engagement correspondingly when a kick-down acceleration condition is satisfied, as hereinafter described. The kick-down is a kind of transmission control technique that shifts down the transmission when the driver depresses the accelerator pedal deeply, to increase acceleration of the vehicle.

At step S204, the control unit 8 determines whether the APS operation signal due to the driver's accelerator pedal operation satisfies the kick-down acceleration condition. The control unit 8 may determine the kick-down acceleration condition by comparing the increase rate (e.g., APS %/sec) of the APS operation signal with the engine torque map (E-MAP).

For example, at the step S204, the control unit 8 may determine that kick-down acceleration condition is satisfied when the increase rate (e.g., APS %/sec) of the APS operation signal is above a predetermined third threshold value (e.g., 40%) stored in the engine torque map (E-MAP) while the vehicle is running above a certain vehicle speed.

Alternatively, the control unit 8 may determine the kick-down acceleration condition based on a difference between a driver's requested torque and an actual torque of the engine 1. It may be understood that, under an abrupt hard acceleration, i.e., under a driver's abrupt and rapid accelerator pedal operation, the actual torque of the engine 1 may not immediately follow the requested torque. In the instant case, operating the supercharger 4 to build more torque of the engine 1 may be helpful for the engine 1 to closely follow the driver's requested torque. Thus, the control unit 8 may determine that the kick-down acceleration condition is satisfied when a difference (illustrated as AT in FIG. 6D) between the driver's requested torque and the actual torque of the engine 1 is greater than a second threshold value.

When the kick-down acceleration condition is not satisfied (S204—No), the control unit 8 maintains, at step S205, the first stroke operation map MAP1 to the DCT 2 to operate the DCT 2 at a normal clutch engagement speed.

When the kick-down acceleration condition is satisfied (S204—Yes), the control unit 8 starts, at step S206, to operate the electric supercharger 4 and applies the second stroke operation map MAP2 in the clutch engagement control of the DCT 2.

Steps S206 to S209 in FIG. 5 are similar to the steps S106 to S109 described in detail with reference to FIG. 3, and thus are not described in further detail.

Therefore, in a kick-down acceleration situation illustrated in FIG. 6A, the electric supercharger 4 is operated as shown in FIG. 6B to supplement the engine torque, and the clutch engagement is accelerated by applying the second stroke operation map MAP2. Therefore, the actual torque of the engine 1 may follow the requested torque more closely than a conventional scheme, and the vehicle acceleration characteristic under a hard acceleration may be enhanced as shown in FIG. 6D and FIG. 6E.

Third Exemplary Embodiments

Figure 7:
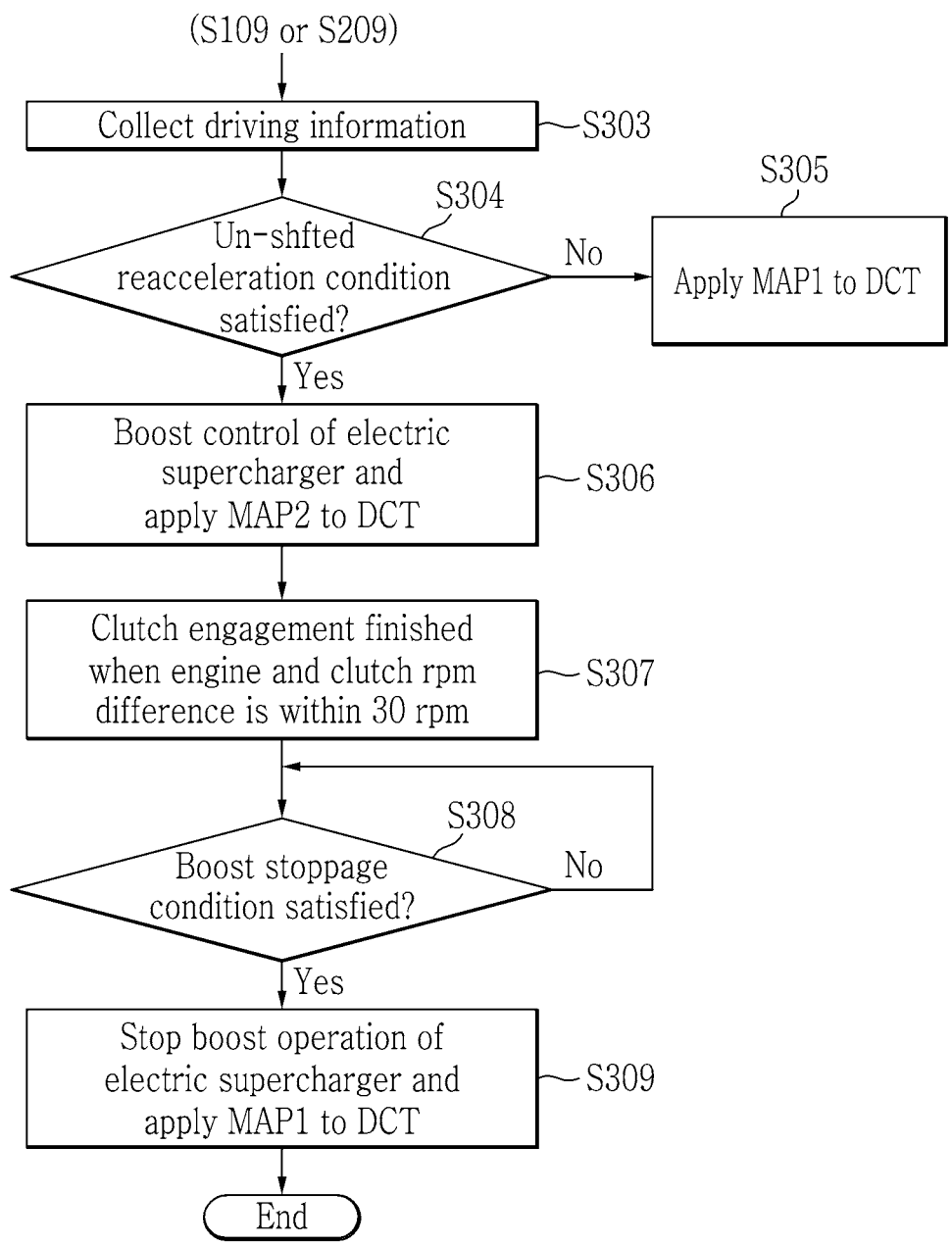
FIG. 7 is a flowchart showing a method of controlling a vehicle transmission in an un-shifted reacceleration condition according to various exemplary embodiments of the present invention.

FIG. 7 is a flowchart showing a method of controlling a vehicle transmission in an un-shifted reacceleration condition according to various exemplary embodiments of the present invention.

Figure 8:
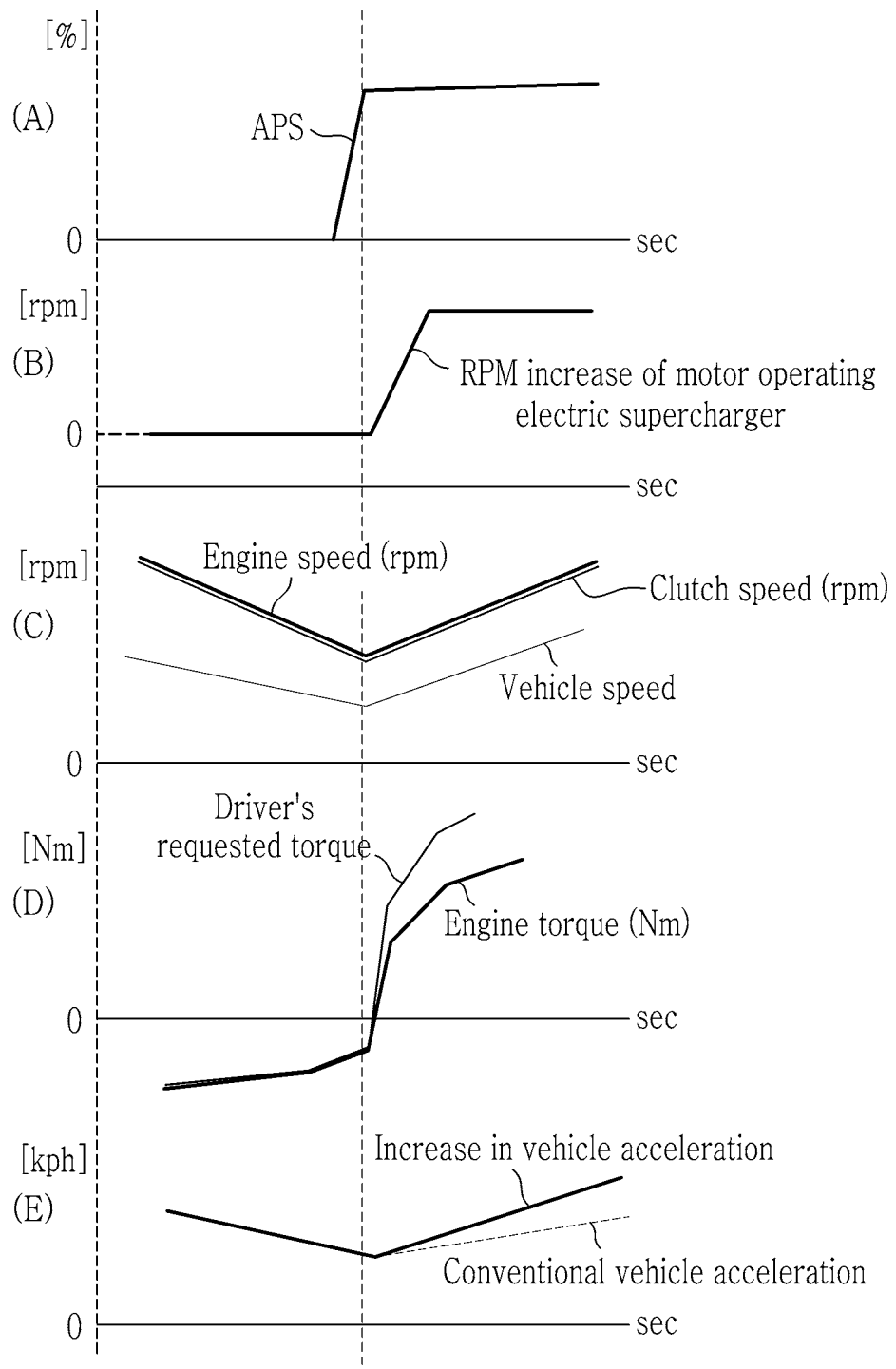
FIG. 8 is a graph showing vehicle transmission control status in the un-shifted reacceleration condition of FIG. 7 according to various exemplary embodiments of the present invention.

FIG. 8 is a graph showing vehicle transmission control status in the un-shifted reacceleration condition of FIG. 7 according to various exemplary embodiments of the present invention.

Referring to FIG. 7 and FIG. 8, a method of controlling a vehicle transmission under an un-shifted reacceleration condition according to various exemplary embodiments of the present invention is described with reference to the case of driving after the control shown in FIG. 3 or after the control shown in FIG. 5.

At step S303, the control unit 8 analyzes driving information collected from the driving information detection unit 7, and controls the DCT clutch engagement correspondingly when an un-shifted reacceleration condition is satisfied, as hereinafter described.

At step S304, the control unit 8 determines whether the APS operation signal due to the driver's accelerator pedal operation satisfies the un-shifted reacceleration condition. The control unit 8 may determine that the un-shifted reacceleration condition is satisfied when the hard acceleration starting-up condition (as described in the various exemplary embodiments with reference to FIG. 3) is satisfied while the vehicle is decelerating due to a brake operation or coasting.

Furthermore, the control unit 8 may determine that the un-shifted reacceleration condition is satisfied when the vehicle is running on a downward sloped road while the kick-down acceleration condition (described in the various exemplary embodiments with reference to FIG. 5) is satisfied. This means that the control unit 8 may further consider a road slope condition in addition to the increase rate of the APS signal, in determining whether the un-shifted reacceleration condition is satisfied.

For example, the kick-down acceleration control may be performed in the various exemplary embodiments while the vehicle is running on a horizontal road or an uphill road.

In comparison, in the third exemplary embodiments of the present invention, even if the increase rate of the APS satisfies the kick-down acceleration condition on the downward sloped road, the control unit 8 may only operate the electric supercharger 4 without performing shifting operation of the DCT 2.

In the instant case also, as shown in FIG. 8, the actual torque of the engine 1 may follow the requested torque more closely than a conventional scheme, and the vehicle acceleration characteristic may be enhanced as shown in FIG. 8E. Furthermore, fuel consumption characteristic of the vehicle on a downslope may be enhanced.

Steps S306 to S309 in FIG. 7 are similar to the steps S106 to S109 described in detail with reference to FIG. 3, and thus are not described in further detail.

Figure 9:
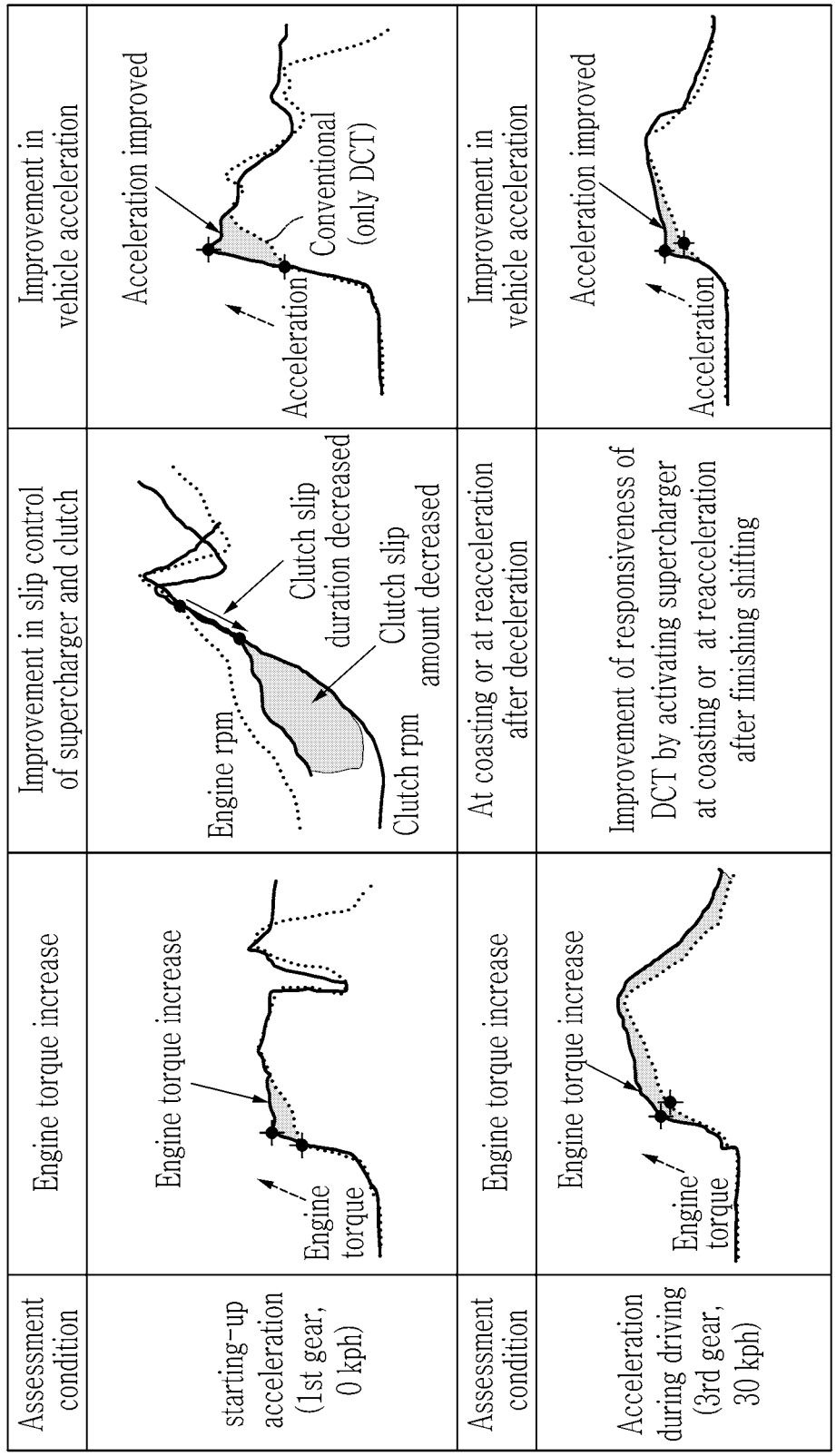
FIG. 9 illustrates an effect of a vehicle transmission system according to an exemplary embodiment of the present invention.

FIG. 9 illustrates an effect of a vehicle transmission system according to an exemplary embodiment of the present invention.

Referring to FIG. 9, cooperative control of the electric supercharger and the DCT according to an exemplary embodiment of the present invention is compared with a conventional scheme with only the DCT.

According to an exemplary embodiment of the present invention, by cooperatively controlling an electric supercharger together with an automated transmission (a DCT in the exemplary embodiment) employing a friction clutch without employing a torque converter, vehicle acceleration characteristic may be improved by complementing the engine torque by the electric supercharger.

Furthermore, by applying rapid clutch stroke operation when the electric supercharger is operated, a clutch slip amount and a slip duration may be decreased, improving acceleration responsiveness and drivability of a vehicle.

Since a torque multiplication effect becomes available for an automated manual transmission, gear ratios of shifting stages of the transmission may be lowered, achieving improvement of fuel consumption characteristic of the vehicle.

It is notable that the present invention is not limited to the above-described embodiments, and variations may be available.

For example, FIG. 1 illustrates that the turbocharger 3 and the electric supercharger 4 are simultaneously employed. However, it may be understood that the present invention is not limited thereto. As a variation, the turbocharger 3 may be omitted, or an additional supercharger may be further employed.

Figure 10:
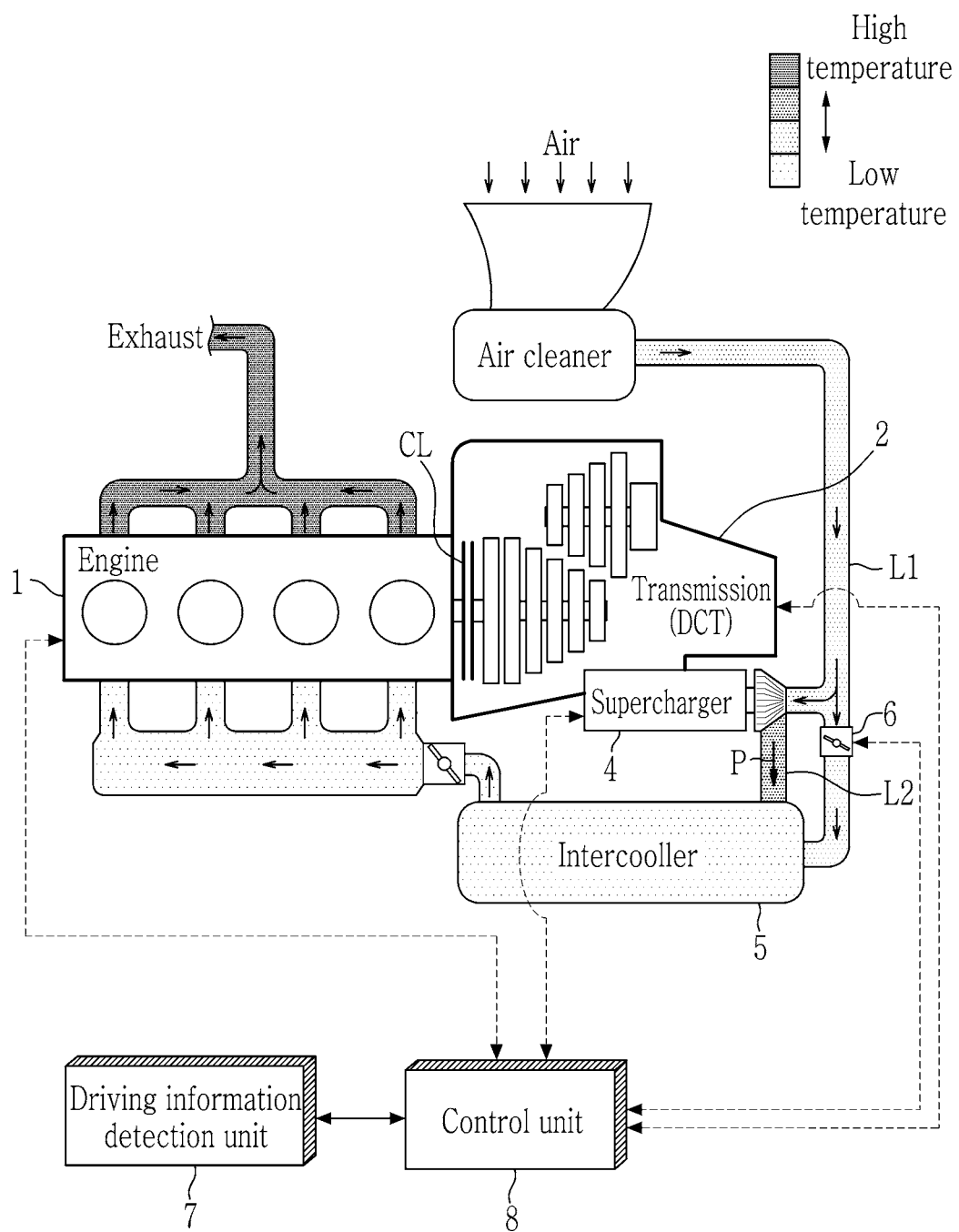
FIG. 10 shows a schematic view of a vehicle transmission system according to various exemplary embodiments of the present invention.

For example, FIG. 10 shows a schematic view of a vehicle transmission system according to various exemplary embodiments of the present invention.

Referring to FIG. 10, a vehicle transmission system according to a variation of the exemplary embodiments is similar as shown in FIG. 1, and the difference lies in that a turbocharger is not employed.

Therefore, the same as in the first to various exemplary embodiments of the present invention, when the electric supercharger 4 is operated under starting-up or acceleration driving condition, the air is detoured to pass through the electric supercharger 4 and the electric supercharger 4 supplies a compressed air to the engine 1.

Thus, in a configuration without employing a turbocharger, a torque multiplication effect may be achieved and acceleration responsiveness may be improved, the same as in the first to various exemplary embodiments.

It may be understood that the hard acceleration starting-up condition and the kick-down acceleration condition described in connection with the various exemplary embodiments may also include whether the vehicle is starting or running on an uphill road.

For example, the control unit 8 may determine that the hard acceleration starting-up condition is satisfied when the vehicle is starting on an uphill road of which the slope is above a predetermined slope. Thus, in the instant case, regardless of whether the accelerator operation is hard and abrupt or not, the electric supercharger 4 may be operated such that a sufficient engine output torque may be obtained to achieve a sufficient acceleration performance of the vehicle on the uphill road. In the instant case, it may be understood that the vehicle may be prevented from being dragged backward (i.e., downward) because of the torque multiplication effect and fast clutch engagement speed.

Furthermore, the present invention is not limited to determining the hard acceleration starting-up condition merely on the increase rate of the APS operation signal. The control unit 8 may determine the hard acceleration starting-up condition based on an increase rate of a machine-requested torque in an autonomous driving situation, which may be obviously understood since the machine-requested torque may be corresponding with a driver's requested torque due to accelerator pedal operation. Therefore, in the instant case, the torque multiplication effect and acceleration responsiveness of the vehicle may be achieved even in an autonomous driving situation.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle transmission system, comprising:
   an engine outputting power;
   a transmission coupled to the engine and including at least one clutch to control torque input from the engine;
   a supercharger compressing an intake air and supplying the compressed intake air to the engine; and
   a control unit that, upon determining that a predetermined acceleration condition is satisfied, operates the supercharger and controls the transmission according to a transmission clutch stroke operation map of operating the supercharger, to vary an engagement speed of the at least one clutch upon when the supercharger is operated.

2. The vehicle transmission system of claim 1, wherein the transmission is one of a dual clutch transmission (DCT) and an automated manual transmission (AMT) without employing a torque converter.

3. The vehicle transmission system of claim 1, further including:
   a turbocharger which is driven by an exhaust pressure of the engine to compress an air to a first boost pressure and to output the compressed intake air to a first intake line connected to the turbocharger and the engine; and
   an intake flow control valve which is mounted at the first intake line and configured to guide the compressed intake air of the first boost pressure to the supercharger through a second intake line branched from the first intake line.

4. The vehicle transmission system of claim 3, wherein the supercharger is configured to compress the intake air of the first boost pressure to a second boost pressure, and to supply the intake air of the second boost pressure to the engine.

5. The vehicle transmission system of claim 3, further including an intercooler mounted on the first and second intake lines and configured to cool the intake air compressed by the turbocharger and the supercharger.

6. The vehicle transmission system of claim 3, wherein the control unit includes:
   an engine controller configured to control an engine torque of the engine based on an accelerator pedal sensor (APS) operation signal;
   a supercharger controller configured of operating the supercharger upon determining that the predetermined acceleration condition is satisfied;

a valve controller configured of closing the intake flow control valve upon operating the supercharger so that the intake air is guided to the supercharger;

a transmission controller configured of applying a plurality of transmission clutch stroke operation maps including the transmission clutch stroke operation map when the supercharger is operated; and an integrated controller configured to control the engine controller, the supercharger controller, the valve controller, and the transmission controller, based on driving information related to the vehicle.

7. The vehicle transmission system of claim 6, wherein the transmission controller is configured to determine that a hard acceleration starting-up condition is satisfied as the predetermined acceleration condition, when an increase rate of the APS operation signal is higher than a predetermined first threshold value while the vehicle is stationary, or when a difference of an actual engine torque from a requested torque by the APS operation signal is greater than a predetermined second threshold value while the vehicle is stationary.

8. The vehicle transmission system of claim 6, wherein the transmission controller is configured to determine that the predetermined acceleration condition is satisfied, when an increase rate of the APS operation signal is greater than a predetermined third threshold value while the vehicle is running, or when a difference of an actual engine torque from a requested torque by the APS operation signal is greater than a predetermined fourth threshold value while the vehicle is running.

9. The vehicle transmission system of claim 8, wherein the transmission controller is configured to determine that a kick-down acceleration condition is satisfied as the predetermined acceleration condition when a road slope detected as the driving information indicates a horizontal road or an uphill road, and that an un-shifted reacceleration condition is satisfied as the predetermined acceleration condition when the road slope detected as the driving information indicates a downhill road.

10. The vehicle transmission system of claim 6,
wherein the transmission controller is configured to control the engagement speed of the at least one clutch according to a first stroke operation map for a normal mode; and
wherein the transmission controller is configured to control the engagement speed of the at least one clutch according to a second stroke operation map upon determining that the predetermined acceleration condition is satisfied, the second stroke operation map facilitating faster clutch engagement speed than the first stroke operation map.

11. The vehicle transmission system of claim 6, wherein the supercharger controller is configured to stop operation of the supercharger when at least one of deceleration of the vehicle, coincidence of a requested torque and an actual engine torque, and starting of shifting to a current shift-stage to another shift-stage is identified.

12. The vehicle transmission system of claim 1, wherein the control unit is configured to operate the supercharger and to control the transmission with the transmission clutch stroke operation map of operating the supercharger, upon determining that the predetermined acceleration condition is satisfied based on an increase rate of a requested torque during an autonomous driving of the vehicle.

13. A method of controlling a transmission of a vehicle, the transmission having at least one clutch to selectively receive a torque of an engine, the vehicle provided with a supercharger for boosting an intake air pressure, the method comprising:

a) collecting, by a control unit, driving information of the vehicle after the engine is started;

b) determining, by the control unit, when a predetermined acceleration condition is satisfied based on an increase rate of a requested torque of the engine;

c) operating, by the control unit, the supercharger upon determining that the predetermined acceleration condition is satisfied; and d) controlling, by the control unit, the transmission according to a transmission clutch stroke operation map corresponding to an operation of the supercharger, to increase an engagement speed of the at least one clutch when the supercharger is operated.

14. The method of claim 13, wherein the step b) includes at least one of:

determining that a hard acceleration starting-up condition is satisfied as the predetermined acceleration condition, when an increase rate of an accelerator pedal sensor (APS) operation signal is higher than a predetermined first threshold value while the vehicle is stationary; and determining that the hard acceleration starting-up condition is satisfied as the predetermined acceleration condition, when a difference of an actual engine torque from a requested torque by the APS operation signal is greater than a predetermined second threshold value while the vehicle is stationary.

15. The method of claim 13, wherein the step b) includes at least one of:

determining that a kick-down acceleration condition is satisfied as the predetermined acceleration condition, when an increase rate of an APS operation signal is greater than a predetermined third threshold value while the vehicle is running; and determining that the kick-down acceleration condition is satisfied as the predetermined acceleration condition, when a difference of an actual engine torque from a requested torque by the APS operation signal is higher than a predetermined fourth threshold value while the vehicle is running.

16. The method of claim 14, wherein
in the step b), an un-shifted reacceleration condition is determined to be satisfied as the predetermined acceleration condition when the hard acceleration starting-up condition is satisfied while the vehicle is decelerating due to a brake operation or coasting.

17. The method of claim 15, wherein
in the step b), an un-shifted reacceleration condition is satisfied as the predetermined acceleration condition, when the kick-down acceleration condition is satisfied while a road slope detected as the driving information indicates a downhill road.

18. The method of claim 13, wherein the step c) includes:
closing an intake flow control valve mounted on a first intake line connected to the engine and bypassing the supercharger, to force an intake air to pass the supercharger through a second intake line branched from the first intake line and connected to the supercharger.

19. The method of claim 13, wherein the step d) includes:
releasing a first stroke operation map for controlling the engagement speed of the at least one clutch at a normal clutch engagement speed; and applying a second stroke operation map for controlling the engagement speed of the at least one clutch at a clutch engagement speed faster than the normal clutch engagement speed.

20. The method of claim 19, further including, after the step d):

determining, by the control unit, when a boost stoppage condition is satisfied;

stopping, by the control unit, operation of the supercharger when the boost stoppage condition is satisfied; and changing, by the control unit, the transmission clutch stroke operation map from the second stroke operation map to the first stroke operation map when the boost stoppage condition is satisfied, wherein the boost stoppage condition is determined to be satisfied when an increase rate of an APS operation signal is decreased below a predetermined first threshold value, or when a vehicle speed decreases by operation of a brake of the vehicle.

\* \* \* \* \*